Figure 1:
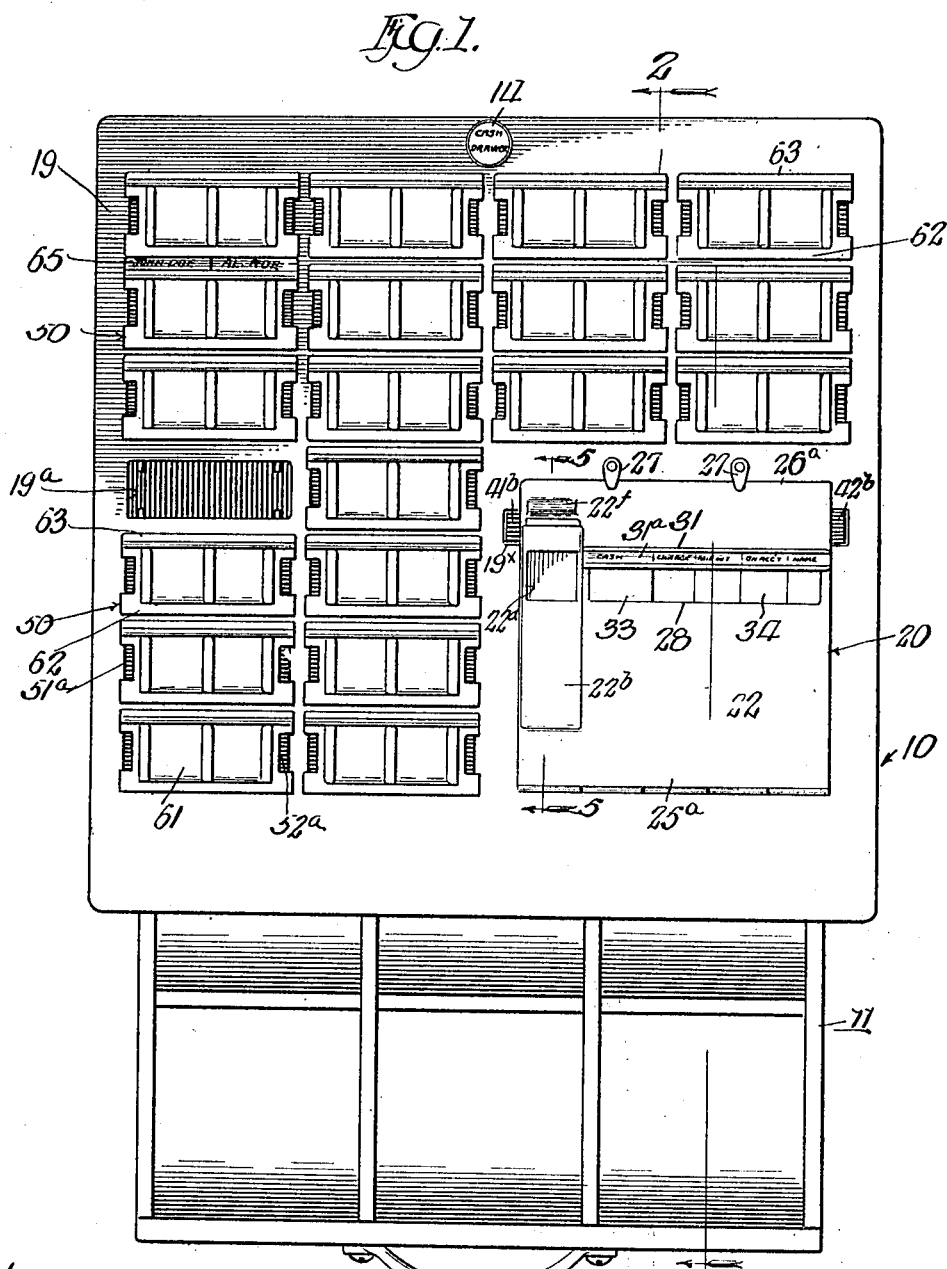

J. L. MORRIS.
APPARATUS FOR CREDIT AND ACCOUNT SYSTEMS.
APPLICATION FILED APR. 1, 1914.

1,206,883.

Patented Dec. 5, 1916.
3 SHEETS—SHEET 1.

Witnesses:
R. L. Stevens.
M. K. Freeman

Inventor
Joshua L. Morris
by Brown & Mellhope Attys

J. L. MORRIS.
APPARATUS FOR CREDIT AND ACCOUNT SYSTEMS.
APPLICATION FILED APR. 1, 1914.
1,206,883.
Patented Dec. 5, 1916.
3 SHEETS—SHEET 2.
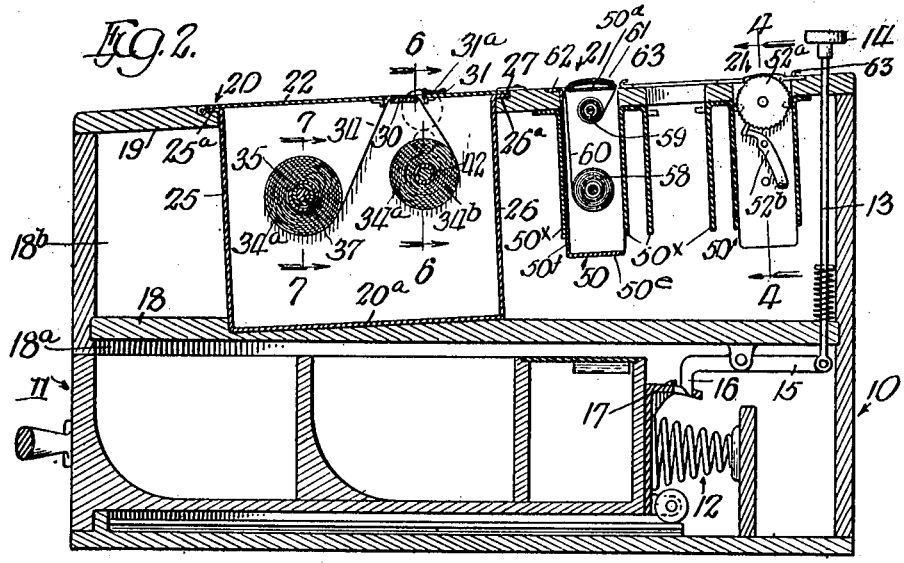
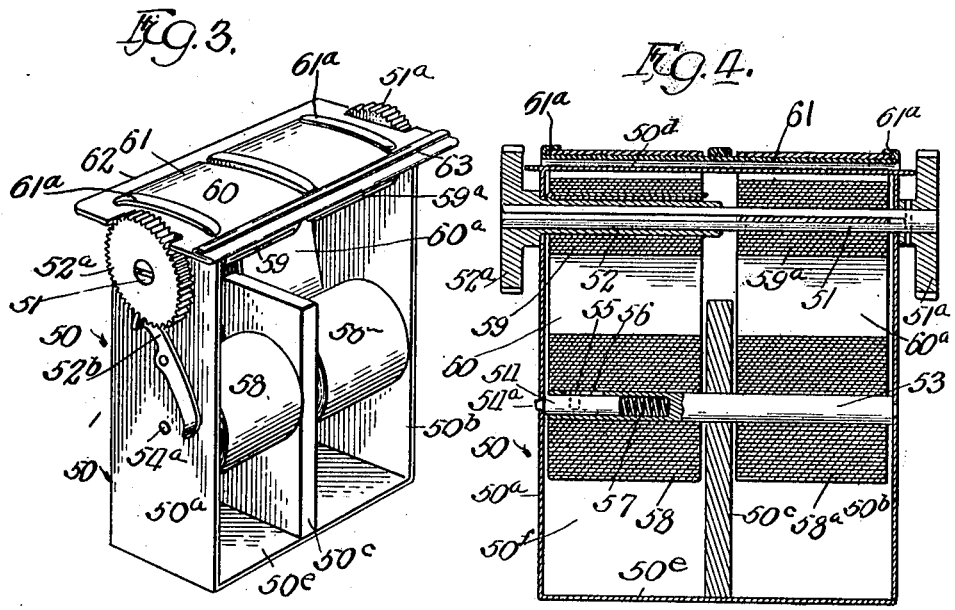
Witnesses:
R. L. Storms
M. K. Freeman
Inventor
Joshua L. Morris
by Brown & Mehlhop Attys J. L. MORRIS.
APPARATUS FOR CREDIT AND ACCOUNT SYSTEMS.
APPLICATION FILED APR. 1, 1914.
1,206,883.
Patented Dec. 5, 1916.
3 SHEETS—SHEET 3.
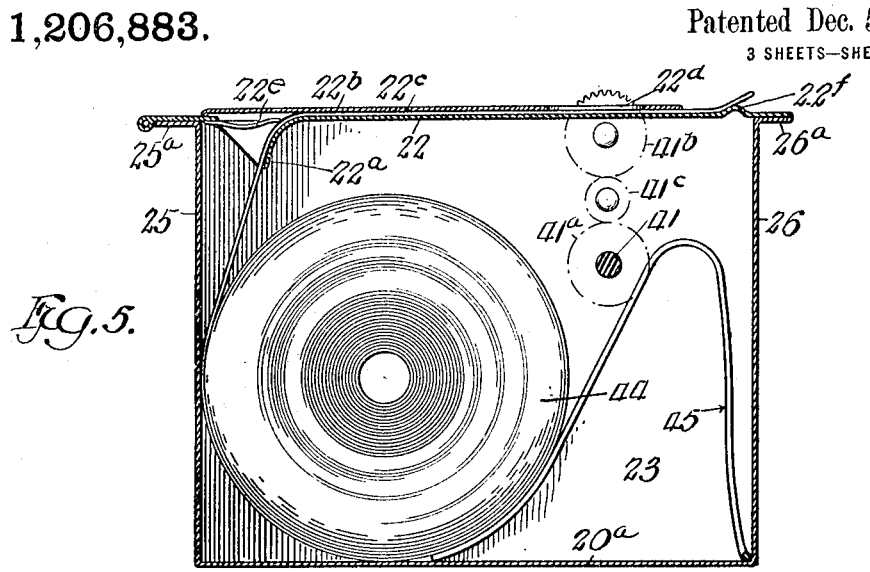
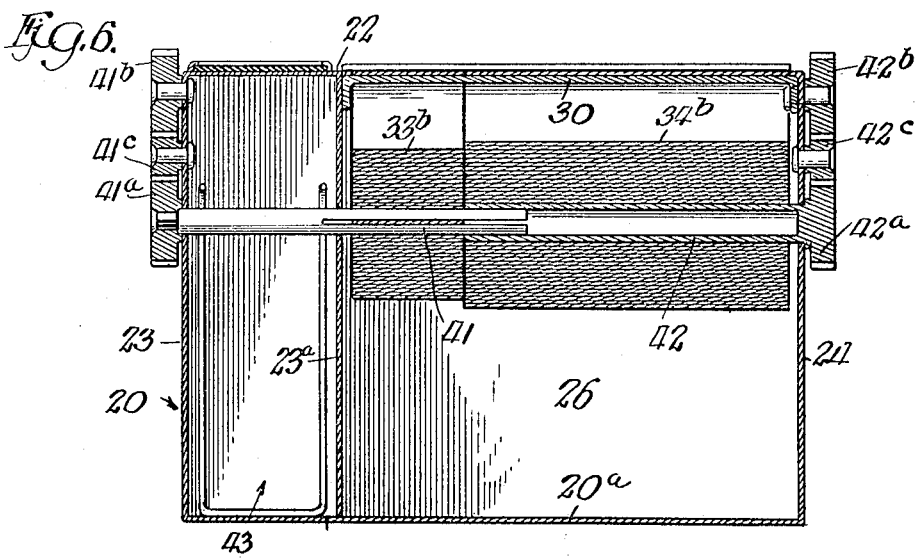
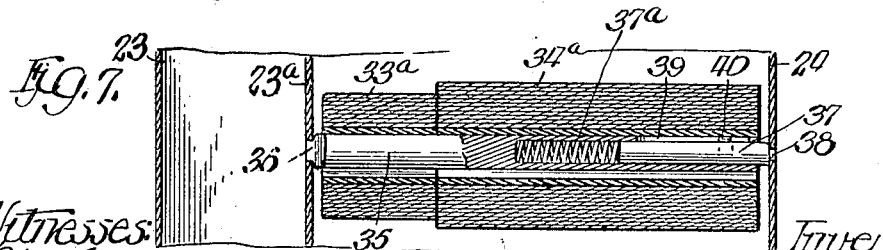

UNITED STATES PATENT OFFICE.

JOSHUA L. MORRIS, OF COUNCIL BLUFFS, IOWA, ASSIGNOR TO MORRIS CASH AND CREDIT REGISTER COMPANY, OF OMAHA, NEBRASKA, A CORPORATION OF MAINE.

APPARATUS FOR CREDIT AND ACCOUNT SYSTEMS.

1,206,883.

Specification of Letters Patent.

Patented Dec. 5, 1916.

Application filed April 1, 1914. Serial No. 828,760.

*To all whom it may concern:*

Be it known that I, JOSHUA L. MORRIS, a citizen of the United States, residing at Council Bluffs, in the county of Pottawattamie and State of Iowa, have invented a new and useful Apparatus for Credit and Account Systems, of which the following is a full, clear, and exact description.

This invention relates to an account and credit system in the use of which the usual books of account may be dispensed with, and more particularly to an apparatus for carrying out the said system.

The invention consists of the matters hereinafter described and more particularly pointed out in the appended claims.

In the familiar credit and account system of the kind heretofore developed, the accuracy and value of the systems are dependent upon the loose manifold account slips made out by the salesman to show each transaction, which slips are filed away in an apparatus for carrying out the system. Such credit and account systems have many disadvantages, the most important of which lies in the fact that not only one or more of the slips may be lost or misplaced in the frequent handling of the filing apparatus, but one or more of the slips may be destroyed or withheld by a dishonest salesman. Thus the account of the individual that the destroyed or lost slip relates to, is made inaccurate to the extent of the amount represented by the absent account slip or slips, and in addition, the evidence which might connect the destruction or loss of the slip with the saleman who made the transaction is gone. Said prior systems are also subject to other disadvantages and sources of error which are well known to those familiar with their practical operation.

The object of the present invention is to obviate the difficulties inherent in the credit and account systems heretofore in use and to provide a system and an apparatus for carrying out the same, in which, although the usual account slips may be used as an additional check, the loss of any of said slips will in no way interfere with or detract from the accuracy of the accounts kept by the system.

The various advantages of my improved system and of the apparatus for carrying out the same will appear as I proceed with my specification.

In the drawings: Figure 1 is a view representing a top plan view of my improved credit and accounting system apparatus. Fig. 2 is a view representing a vertical section through the apparatus in a plane indicated by the line 2—2 of Fig. 1. Fig. 3 is a view representing in perspective one of a plurality of removable casings, each containing preferably two account strips for two different individuals. Fig. 4 is a view representing a vertical section through one of said casings, in a plane indicated by the line 4—4 of Fig. 2, the section being made to larger scale than the view shown in Fig. 2. Fig. 5 is a view representing a vertical section through Fig. 1 in a plane indicated by the line 5—5 thereof. Fig. 6 is a view representing a vertical section through Fig. 2 in a plane indicated by the line 6—6 thereof. Fig. 7 is a view representing a vertical section through Fig. 2 on a plane indicated by the line 7—7 thereof.

Referring now to the drawings, 10 indicates a box or cabinet which contains my improved credit and account system apparatus. Said cabinet may be of any familiar construction, and is provided at the bottom with the usual spring-controlled, normally locked cash drawer 11, as in the case of cash registers and the like. Any convenient means may be used for releasing said cash drawer. As shown, 12 indicates a coiled spring which normally tends to open said cash drawer and 13, a spring-controlled plunger placed at the rear of the cabinet 10 and extending above its top into a convenient position to be reached by the salesman. Said plunger is provided at the top with a button 14 for depressing it and acts to operate a lever 15 carrying a pawl 16, which coacts with a catch 17 at the rear end of the cash drawer so as to lock said drawer in the cabinet. By depressing the button 14, the cash drawer is released and when the drawer is closed, it is automatically locked by the pawl 16 and catch 17.

The cabinet 10 is divided transversely by means of a horizontal partition wall 18, which separates the compartment 18ᵃ in which the cash drawer is contained from a compartment 18ᵇ above it, which contains the credit and account keeping apparatus. The cabinet 10 has a fixed top wall 19, which has a plurality of apertures or openings to receive boxes or cases containing units which, as will appear contain the record strips on which are entered the various accounts provided by the system. Said boxes are preferably supported, as shown, from the fixed top wall 19 of the cabinet.

20 indicates a comparatively large box for containing the general account record strips, and 21, a plurality of small boxes, each of which is perferably constructed to contain the record strips for two different individual accounts.

The box 20 for the general account record is preferably placed at the lower or front right hand corner of the cabinet 10, as shown in Fig. 1. Said box is preferably made of sheet metal and has a bottom wall 20ᵃ, a hinged top wall or cover 22, upright side walls 23, 24 and front and rear walls 25, 26. Said box also has an upright partition wall 23ᵃ extending parallel to its side walls 23, 24 and dividing it into two compartments. Said walls are attached together in any convenient manner and the front and rear walls 25, 26, respectively, are provided, as shown, with horizontal flanges 25ᵃ, 26ᵃ, which have supporting engagement with the fixed top 19 of the cabinet and are let into a suitable recess in said top wall. The cover 22 of the box 20 is preferably hinged at its forward edge so that it may be opened upwardly to give access to the interior of the box, and pivoted buttons 27, 27 are mounted on the top wall 19 of the cabinet adjacent the rear margin of said cover for locking the same in closed position.

The cover 22 has an elongated slot 28 near its rear margin below which is fixed a transverse, horizontal platen bar 30 that is secured at one end to the end wall 24 of the box 20, and at its other end to the partition wall 23ᵃ. Back of the slot 28 is attached to the cover 22 a card holding plate 31 of any convenient construction.

31ᵃ indicates a card carried by said plate bearing at suitably spaced intervals, running from left to right of its length, the words "Cash," "Charge," "Paid out," "On account" and "Name."

In the right hand compartment of the box 20 are located two separate record strips which are arranged to be fed side by side over the platen bar 30 and mechanism is provided whereby each record strip may be fed independently over said platen bar. One of the record strips, the one at the left, as shown in the drawings, is of the width of the space on the card 31ᵃ bearing the word "Cash" and the other record strip, that on the right is of a width equal to the total length of space occupied by the words "Charge," "Paid out," "On account" and "Name."

33 indicates the first named or cash record strip and 34, the general record strip which is intended to receive the other items enumerated on the card 31ᵃ.

The cash record strip 33 is wound from a loose supply roll 33ᵃ (see Fig. 7) to a rewind roll 33ᵇ (see Fig. 6), while the general record strip 34 is wound from a loose supply roll 34ᵃ (see Fig. 7) to a rewind roll 34ᵇ (see Fig. 6). The loose rolls 33ᵃ, 34ᵃ are mounted adjacent each other on a shaft 35. Said shaft may be of any familiar construction adapting it for the removal and replacement of the rolls 33ᵃ, 34ᵃ, after they have been exhausted. As shown, said shaft has at one end a square reduced end part 36, which engages in a suitable aperture in the partition wall 23ᵃ and has its other end hollow to receive a spring 37ᵃ and an associated rod 37, which has a reduced end 38 that is engaged in a suitable aperture in the end made wall 24 of the box 20. The hollow part of the shaft 35 is provided with a longitudinal slot 39 for engagement with a pin 40 on the rod 37 in such manner that relative rotation between the rod 37 and the shaft 35 is prevented. Manifestly, by pushing the rod 37 inwardly against the action of the spring 37ᵃ which controls it, the shaft, as a whole, may be shortened, and may be removed so as to thread upon it a new set of record rolls 33ᵃ, 34ᵃ.

The rewind rolls 33ᵇ, 34ᵇ are mounted on separate shafts 41, 42, respectively. The shaft 41 has rotative bearing in suitable apertures formed in the end wall 23 and in the partition wall 23ᵃ of the casing. Said shaft projects beyond that end of the rewind roll 33ᵇ which is proximate to the rewind roll 34ᵇ and thus forms a bearing for the inner end of the shaft 42 which is hollow and which has its other end rotatively mounted in the end wall 24 of the casing. The shaft 42 projects beyond the end wall 24 of the casing and is provided with a spur gear 42ᵃ. The shaft 41 projects beyond the end wall 23 and is there provided with a spur gear 41ᵃ. There are loosely journaled on the end walls 23, 24, respectively, spur gears 41ᵇ, 42ᵇ, which have their peripheries projecting slightly above the top surface of the casing so that movement may be imparted to them by means of the thumb or finger. The movement of said gears is imparted to the respective gears 41ᵃ, 42ᵃ, that they are designed to operate by means of intermediate idle gears 41ᶜ, 42ᶜ, respectively. Manifestly, by means of the gear 41ᵇ, the rewind roll 33ᵇ may be rotated to wind the record strip 33 and by means of the gear 42ᵇ, the rewind roll 34ᵇ may be rotated to wind the record strip 44.

In the left hand compartment of the box 20 (which is indicated by the numeral 43—see Figs. 5 and 6) there is located the usual check strip roll 44. Said roll is held under tension by means of a spring 45 in a familiar manner and the record strip itself is fed through a flat channel 22$^c$ on the top wall 22 of the box 20. Said channel is closed on top by a flat plate 22$^b$ which is spaced a little more than the thickness of the check strip above the said top wall 22, and is provided with an opening 22$^d$ in line with the slot 28 in said top wall, so that the check strip may be written upon. The forward or inlet end of the channel 22$^c$ has a flared mouth 22$^a$ to guide the check strip smoothly into said channel and a spring tongue 22$^e$ is placed at this point for engagement with the top surface of the check strip to prevent a backward movement, thereof, but without interfering with the forward feed of said strip.

Beyond the near end of the channel 22$^c$ the top wall 22 is provided with an inclined transversely extending shoulder 22$^f$ (see Fig. 5) adapted to bend the end of the strip in an upward direction, away from the surface of said top wall for convenience in grasping the strip when a check is to be torn from it to hand as a receipt to the purchaser, in the usual way. The rear edge of the top plate 22$^b$ of the channel 22$^c$ forms a cutting edge for detaching a check.

Each of the boxes for the individual accounts are alike and a description of one will suffice for all. Said boxes are shown more clearly in Figs. 2, 3, and 4, 21 indicating said box, as a whole. The box 21 is made preferably of light sheet metal as in the case of the box 20 and has a body 50 which is open on its rear side (see Fig. 3) so that access may be had to its interior to remove and renew the record strips carried by said box. 50$^a$, 50$^b$ indicate the two upright side walls of the box and 50$^c$ the bottom wall. 50$^d$ indicates the top wall of the box. 58, 58$^a$ indicate two record strip rolls carried on a common shaft 53 which has bearing in the two upright side walls 50$^a$, 50$^b$, and in an upright partition 50$^e$ which divides the box into two compartments one for each roll, said shaft being hollow at one end to receive a rod—54 which has a pin and slot, (55, 56) engagement with said shaft, a reduced bearing end 54$^a$, and spring 57 to hold said end in bearing engagement. The record strips pass from the rolls 58, 58$^a$, up through suitable slots formed at the junction of the rear and top wall of said box, passing over a platen 61 having an edge retaining flange 61$^a$ and then, down through like slots formed in said top wall in the plane of the front edges of the side walls, to rewind rolls 59, 59$^a$. Said rolls are mounted on two independent concentric shafts 52, 51, (see Fig. 4) journaled in the upright walls of the box in the same manner as the rewind shafts in the box 20. The flanges on the platen, as shown, are placed at one edge only thereof (see Fig. 3) and act to hold the record strips down smoothly in their passage over the platen. The rewind shafts 52, 51 are extended beyond the side walls of the box where they are provided with toothed wheels 51$^a$ 52$^a$ which have their peripheries extended above the top of the box so that they may be operated by the thumb or finger to actuate their respective shafts. Each is engaged by a gravity controlled retaining pawl 52$^b$ to prevent it from being rotated backward. The box has suitable horizontal flanges 62 at the top to support it from the top wall of the cabinet and preferably depending plates 50$^x$ are fixed to said top wall to provide pockets to receive the body 50 of said box, and maintain it firmly in position. Each box carries a flanged card holding plate 63, to retain a name card for each of the two record strips as indicated at 65 in Fig. 1. As the boxes 21 are comparatively small and as each box 21 provides for two individual accounts, it is apparent that a large number of accounts may be kept in a cabinet of size that is not unduly large and as many as two hundred accounts may be kept in a cabinet of quite convenient size.

In carrying out my credit and account system, the general items of "cash," "charge," "paid out" and paid "on account" are entered in the proper columns on the record strips in the box 20 in the usual manner, and when a cash transaction occurs a check from the check strip is made out and presented to the customer as heretofore. When, however, a charge is made against a customer, an entry of the amount is not only made on the record strip 34 in the column headed "Charge," together with the name which is written under the column headed "Name," but the amount is also entered on the record strip of one of the boxes 21 under the card bearing the customer's name. In addition the amount of the charge is added to the amount shown on said record strip, so that the last amount written will represent what that customer owes. The toothed wheel actuating the rewind roll of said customer's record strip is then operated to wind said record strip until just the amount owed appears below his name. In the same way, if a customer pays anything on account, the amount to be credited is entered on the general record strip 34 in the column headed "On account," together with his name in the column headed "Name" and in addition the amount to be credited is likewise entered on his individual record account strip, under the amount owed as appears on said record strip, said amount is subtracted and any balance due written below the amount credited and the strip then fed forward as before until simply the balance alone appears. It will be manifest that each account is thus kept right up to date and no book keeping is required to find out what any customer owes or, how his account stands. In addition the box 20 provides the general account necessary for the merchant's own business.

It will be apparent to those familiar with the art that by my new credit and account system apparatus, the merchant is offered not only all of the advantages of the usual cash register but in addition, a credit and account system which renders the keeping of the usual books of account unnecessary and wherein all accounts are always kept intact and separate without any danger of a loss of any item of account.

While I have shown in the drawings the apparatus in one manner of construction as to mechanical details, it is to be understood that the invention is not limited thereto, since it is apparent that said apparatus may be modified in various ways without departing from the spirit of the invention.

I claim as my invention:—

1. A credit and account system apparatus comprising a cabinet, and a plurality of units supported in said cabinet and separably removable therefrom, one of said units being larger and being adapted for cash and general account, said larger unit containing record strips for cash and for general account, and means for supporting and means for feeding said strips, and the remainder of said units being smaller and adapted for individual accounts, each of said individual units containing an account strip and including means for separately feeding said account strip, and all of said units being provided with suitable platens over which the respective strips contained by them are fed.

2. A credit and account system apparatus, comprising a cabinet, and a plurality of units supported in said cabinet and separably removable therefrom, each unit consisting of a box supported from the top wall of said cabinet, one of said units being larger and being adapted for cash and general account, said larger unit containing a record strip for items of general account, and a record strip for cash, and containing means for feeding said cash and general record strips independently, the remainder of said units consisting of smaller boxes, each supported from the top of said cabinet, each containing one or more record strips, each of said record strips being for an individual account, and means for independently feeding each individual record strip in said box, an individual name card associated with each individual record strip and attached to the box in which it is contained and all of said units being provided with suitable platens over which the respective strips contained by them are fed.

3. A credit and account system apparatus, comprising a cabinet, and a plurality of units supported in said cabinet and separably removable therefrom, each of said units including a box supported from the top wall of said cabinet, one of said boxes being larger and containing supply and rewind rolls for cash items and for general account, a top for said record box provided with a slot and a platen supported in said box beneath said slot, the record strips in said box being fed over said platen, means for independently feeding said cash and general record strips, and the remainder of said boxes being smaller and containing one or more individual record account strips, a platen in each of said individual account boxes over which the record strip or record strips contained therein are fed, a name plate associated with each individual record strip and fixed to the top of its box and each unit being provided with means for preventing the several record strips contained therein from being wound in a reverse direction.

4. A credit and account system apparatus, comprising a cabinet, and a plurality of units supported in said cabinet and separably removable therefrom, each of said units including a box supported from the top wall of said cabinet, one of said boxes being larger and containing supply and rewind rolls for cash items and for general account, means for feeding the strips on said rolls independently, a top wall for said box provided with a slot and a platen supported in said box beneath said slot, over which the record strips in said box are fed, the remainder of said boxes being smaller and each containing two individual record account strips, a platen on top of each individual record box over which the two record strips contained by it are fed, said record boxes inclosing the two strips except at the part of the strip which is on the platen, means for feeding each of said individual record strips independently of the other in the same box, and means acting to prevent back feed of each individual record strip.

JOSHUA L. MORRIS.

Witnesses:
R. D. M. TURNER,
T. G. TURNER.

Copies of this patent may be obtained for five cents each, by addressing the "Commissioner of Patents, Washington, D. C."